No. 751,177.                                   Patented February 2, 1904.

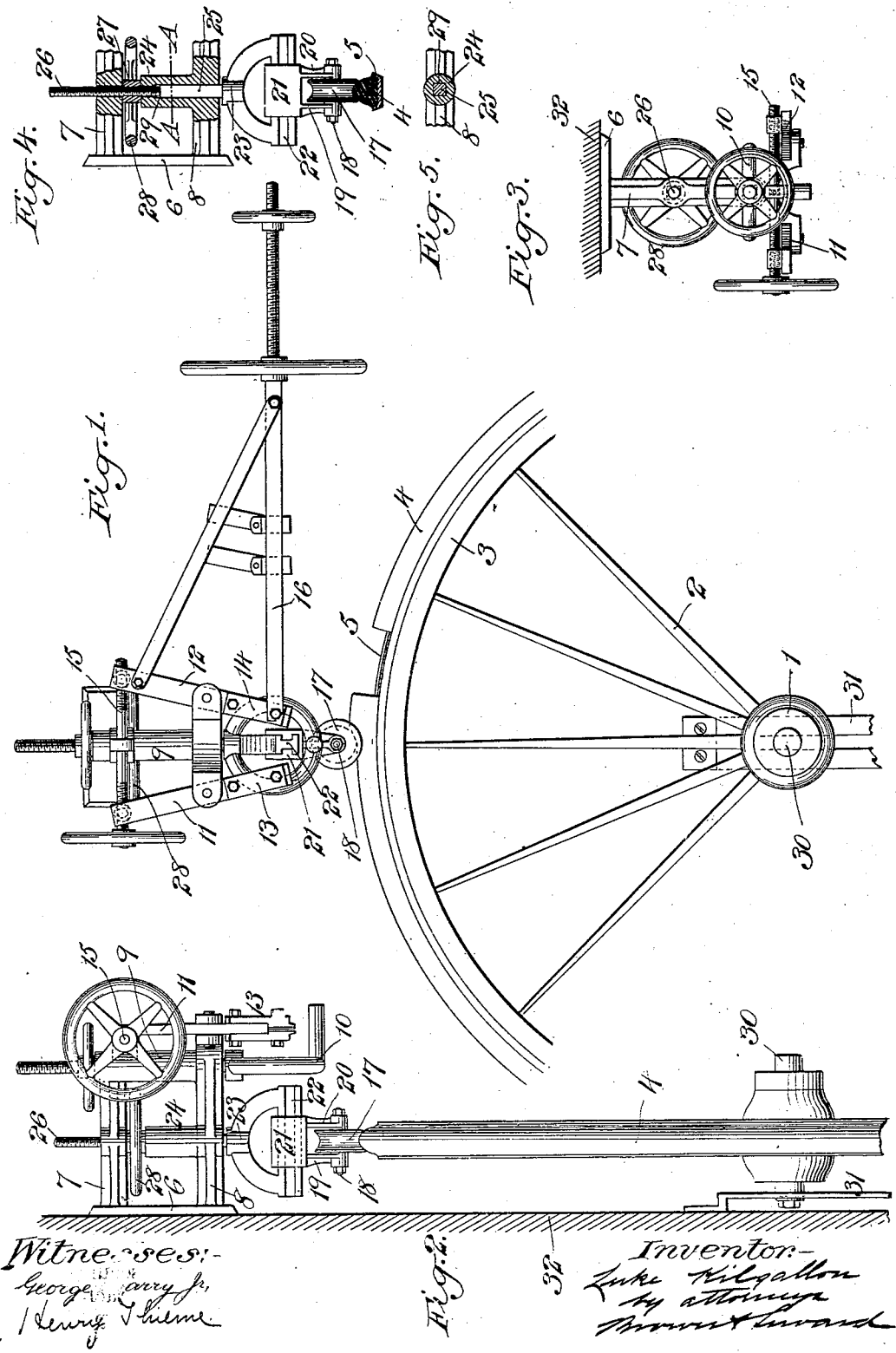

UNITED STATES PATENT OFFICE.

LUKE KILGALLON, OF FAR ROCKAWAY, NEW YORK.

DEVICE FOR ATTACHING RUBBER TIRES TO VEHICLE-WHEELS.

SPECIFICATION forming part of Letters Patent No. 751,177, dated February 2, 1904.

Application filed March 18, 1902. Serial No. 98,724. (No model.)

*To all whom it may concern:*

Be it known that I, LUKE KILGALLON, a citizen of the United States, and a resident of Far Rockaway, in the county of Queens and State of New York, have invented a new and useful Improvement in Devices for Attaching Rubber Tires to Vehicle-Wheels, of which the following is a specification.

My invention relates to an improvement in devices for attaching rubber tires to vehicle-wheels; and it has for its object to provide a very simple and effective device for forcing the ends of the tire together after the ends of the attaching band or wires have been secured.

A further object is to provide a device of the above character in which an even pressure may be brought to bear upon the tread of the tire as the ends of the tire are being brought together.

A still further object is to provide a device in which the device for bringing the ends of the tire together may be adjusted to bear against the tread of the tire at any desired pressure.

A practical embodiment of my invention is represented in the accompanying drawings, in which—

Figure 1 is a view in front elevation of a portion of a vehicle-wheel, its adjustable support, and the device for attaching the tire to the vehicle-wheel with my improved attachment for bringing the ends of the tire together after the ends of the attaching band or wires have been secured. Fig. 2 is a side view of the same, a portion of the band or wire tightening device being removed. Fig. 3 is a top plan view of that part of the tire-attaching device which embodies my improvement. Fig. 4 is a vertical central section through a portion of the tire-attaching device, showing the means for adjusting the pressure-roller; and Fig. 5 is a horizontal section in the plane of the line A A of Fig. 4.

The hub of the vehicle-wheel shown herein is denoted by 1, its spokes by 2, and its rim by 3. The tire is denoted by 4, and the attaching band or wires is denoted by 5.

The tire-attaching device comprises a bracket consisting of a suitable base-plate 6, having upper and lower outwardly-extended arms 7 and 8, the outer ends of which are connected by an upright 9, in which is adjustably mounted the hanger 10, upon which the wheel is hung when the ends of the band or wires 5 are being drawn together and brazed. The clamps for drawing the ends of the wires together comprise two arms 11 and 12, having clamping-jaws 13 and 14. An adjusting-screw 15 has a screw-threaded engagement with the upper arms of the clamps for operating them. A supplementary framework 16 is carried by one of the clamps, in the present instance the clamp 12.

The parts hereinbefore described are of well-known construction and will not be more particularly described, as they form no part of the present invention.

A pressure-roller 17 is mounted to rotate on an axle 18, carried by the depending arms 19 and 20 of a hanger 21, which hanger in turn is carried by the head 22 of a longitudinally-adjustable support 23. The hanger 21 and the head 22 have a dovetailed engagement with each other, so as to permit the hanger, and thereby the pressure-roller, to be adjusted laterally.

A hollow lug 24 projects upwardly from the lower arm 8 to within a short distance of the upper arm 7 of the supporting-bracket.

The shank of the hanger-support 23 is provided with a squared portion 25 and a screw-threaded portion 26. This shank extends upwardly through the arm 8, the lug 6, and the arm 7, and an adjusting-nut 27 has a screw-threaded engagement with the said shank between the top of the lug 24 and the arm 7, which nut is provided with a suitable handle 28. The squared portion 25 of the shank loosely fits within a squared portion 29 in the lug 24, so as to prevent the turning of the hanger-support as it is adjusted longitudinally.

An axle-pin 30 may be s 'red in different vertical positions along a bi ket 31, secured to the wall or the other support 32 beneath the tire-attaching device. This axle-pin 30 is adapted to engage the hub 1 of the vehicle-wheel for supporting the wheel in the desired position beneath the pressure-roller 17.

The operation of the device is as follows:

After the ends of the band or wires 5 have been drawn together and secured—as, for instance, by brazing—in the usual manner while the wheel has been supported on the hanger 10 of the tire-attaching device the wheel is then removed from the hanger 10, and the hub is caused to engage the axle-pin 30. The axle-pin 30 is then adjusted vertically until the tire 4 is brought into close proximity to the pressure-wheel 17. The hanger 21 of the pressure-wheel is then adjusted laterally until the pressure-wheel is brought into alinement with the tread of the tire. The adjusting-wheel 28 is then turned in a direction to lower the pressure-wheel onto the tread of the tire. The amount of pressure which the wheel 17 will exert can be accurately adjusted to suit different requirements. The vehicle-wheel may then be partially rotated back and forth for gradually forcing the ends of the tire toward each other until the ends are finally caused to meet, thus completing the circle of the tire and covering the portions of the ends of the attaching band or wires which have been secured.

It will be seen that by the use of the above attachment I am enabled to distribute the material of the tire equally around the periphery of the wheel. This has been very difficult to do where the use of a hand-pressure device has been attempted. It will further be seen that the device is extremely simple and can be readily combined with the device already in use for bringing the ends of the tire-attaching band or wires together. Furthermore, the device may be quickly adjusted for use in connection with vehicle-wheels of greatly-varying diameters by adjusting the axle-pin 30 toward and away from the pressure-wheel 17.

It is evident that changes might be resorted to in the construction, form, and arrangement of the several parts without departing from the spirit and scope of my invention. Hence I do not wish to limit myself strictly to the structure herein set forth; but

What I claim is—

In a device for attaching tires to vehicle-wheels, a support for the vehicle-wheel, a bracket, a vertically-adjustable support therein having a head and shank, a pressure-wheel and a hanger therefor, having a dovetailed engagement with the head of the adjustable support to permit the hanger and thereby the wheel to be adjusted laterally.

In testimony that I claim the foregoing as my invention I have signed my name, in presence of two witnesses, this 17th day of March, 1902.

LUKE KILGALLON.

Witnesses:
FREDK. HAYNES,
C. S. SUNDGREN.